US008305969B2

(12) United States Patent
Nobukiyo et al.

(10) Patent No.: US 8,305,969 B2
(45) Date of Patent: Nov. 6, 2012

(54) RADIO NETWORK CONTROLLING METHOD, RADIO COMMUNICATION SYSTEM AND RADIO NETWORK CONTROLLER

(75) Inventors: Takahiro Nobukiyo, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1175 days.

(21) Appl. No.: 11/577,865

(22) PCT Filed: Oct. 25, 2005

(86) PCT No.: PCT/JP2005/019948

§ 371 (c)(1),
(2), (4) Date: May 29, 2007

(87) PCT Pub. No.: WO2006/046728

PCT Pub. Date: May 4, 2006

(65) Prior Publication Data

US 2009/0154400 A1 Jun. 18, 2009

(30) Foreign Application Priority Data

Oct. 25, 2004 (JP) ................................ 2004-309618

(51) Int. Cl.
*H04W 4/00* (2009.01)

(52) U.S. Cl. ........ 370/329; 370/320; 455/450; 455/451; 455/452; 455/453; 455/454; 455/522

(58) Field of Classification Search .................. 370/320, 370/329; 455/522, 450–454
See application file for complete search history.

(56) References Cited

U.S. PATENT DOCUMENTS

| | | | | |
|---|---|---|---|---|
| 7,209,456 | B2 * | 4/2007 | Kwak et al. | 370/318 |
| 2002/0173312 | A1 * | 11/2002 | Takano et al. | 455/452 |
| 2003/0210660 | A1 * | 11/2003 | Wiberg et al. | 370/320 |

FOREIGN PATENT DOCUMENTS

| | | | |
|---|---|---|---|
| EP | 1237296 | A2 | 9/2002 |
| EP | 1467498 | A1 | 10/2004 |
| JP | 2002-217956 | A | 8/2002 |
| JP | 2003-070054 | A | 3/2003 |
| JP | 2004-32211 | A | 1/2004 |
| JP | 2004-247950 | A | 9/2004 |
| WO | 03107707 | A1 | 12/2003 |

OTHER PUBLICATIONS

3 GPP TS 25.211 V5.5.0 (Sep. 2003), Release 5, pp. 19-41.
3 GPP TR 25.858 V5.0.0 (Mar. 2002), Release 5, p. 6.
Anti Toskala, WCDMA for UMTS, U.K., 2001, pp. 211-213.
3 GPP TS 25.433 V5.9.0 (Jun. 2004), Release 5, pp. 40-46.
Kimmo Hiltunen et al., “Performance of Link Admission Control in a WCDMA System with HS-DSCH and Mixed Services”, PIMRC, IEEE, 2004.
European Search Report issued Mar. 9, 2012 in corresponding European Application No. 05799086.3.

* cited by examiner

*Primary Examiner* — Amancio Gonzalez
(74) *Attorney, Agent, or Firm* — Sughrue Mion, PLLC

(57) ABSTRACT

When determination is made that a channel for high-speed downlink packet transmission is short in power by the calculation of power assigned to a downlink shared channel and an activity ratio of the power assigned to the downlink shared channel from transmission power of all the channels and transmission power of other channel than a downlink shared channel for high-speed downlink packet transmission, a total sum of transmission power of dedicated channels is reduced by lowering a rate of a connected dedicated channel for data reception, thereby increasing power assigned to the channel for high-speed downlink packet transmission.

15 Claims, 11 Drawing Sheets

FIG. 4

| | | $P_U$ Low | $P_U$ Medium | $P_U$ High |
|---|---|---|---|---|
| $U_{PT}$ | High | [11]CASE 3 | [21]CASE 3 | [31]CASE 2 |
| | Medium | [12]CASE 3 | [22]CASE 2 | [32]CASE 1 |
| | Low | [13]CASE 2 | [23]CASE 1 | [33]CASE 1 |

$Th_{PUP\_High}$ $Th_{PUP\_Medium}$ $Th_{UP\_Medium}$ $Th_{UP\_High}$

RADIO NETWORK CONTROLLING METHOD, RADIO COMMUNICATION SYSTEM AND RADIO NETWORK CONTROLLER

FIELD OF THE INVENTION

The present invention relates to a radio network controlling method, a radio communication system and a radio network controller and, more particularly, to a radio network controlling method in a system which executes high-speed downlink packet transmission, a radio communication system, and a radio network controller.

DESCRIPTION OF THE RELATED ART

As a system of transmitting data from a radio network controller in a mobile communication system to a mobile station in a cell under the control of a base station under the control of the radio network controller, defined in the specification (3GPP TS25.211 V5.5.0 (2003-09), 3GPP TS25.858 V5.0.0 (2002-03)) of the third generation mobile communication system standardization project 3GPP (3rd Group Partnership Project) and the like are a system using a downlink dedicated channel (DPCH: Dedicated Physical Channel) and the HSDPA system.

DPCH is a dedicated channel set for each mobile station. On the other hand, the HSDPA system requires setting, as downward channels, a downlink shared channel (HS-PDSCH: High Speed-Physical Downlink Shared Channel), a downlink shared control channel (HS-SCCH: High Speed-Shared Control Channel) and a DPCH for downlink control. HS-PDSCH and HS-SCCH are used time-divisionally among mobile stations. HS-PDSCH is a channel for data transmission and HS-SCCH is a channel for controlling data transmission from a base station to a mobile station. DPCH for control is, in particular, called Associated DPCH (A-DPCH).

DPCH (including A-DPCH) is subjected to closed-loop type transmission power control to make reception quality of a mobile station constant. On the other hand, to HS-PDSCH and HS-SCCH used in HSDPA, power remaining after assigning power to common channels such as CPICH (Common Pilot Channel) and FACH (Forward Access Channel) and DPCH is assigned.

When receiving data from a base station by the DPCH or HSDPA system, a mobile station requests a radio network controller to set up DPCH. The radio network controller executes admission control and estimates a load of a cell which will be increased by the set-up of DPCH and when the estimated load is smaller than a threshold value, allows set-up of DPCH and when the estimated load is equal to or larger than the threshold value, refuses set-up of DPCH (written by Antti Toskala, WCDMA for UMTS, U.K., 2001, P 211-213). The threshold value of admission control can be set individually for each of DPCH and A-DPCH.

The above described radio network controlling method has a problem in assigning power by the base station and executing admission control by the radio network controller. More specifically, the base station preferentially assigns power to a common channel and DPCH and assigns the remaining to a channel for HSDPA. Accordingly, even when power assignment to a channel for HSDPA is small, the base station can not regulate use of DPCH. In addition, without information about total transmission power of the base station or about power assigned to HSDPA, the radio network controller can not regulate use of DPCH.

In order to solve the above problem, defined in the 3GPP specification, 3GPP TS25.433 V5.9.0 (2004-06) as common measurement are transmitted carrier power (hereinafter referred to as TCP) and transmitted carrier power of all codes not used for HS-PDSCH or HS-SCCH transmission (hereinafter referred to as Non-HSDPA power). TCP represents total transmission power of the base station. Non-HSDPA power represents transmission power of channels other than HS-PDSCH and HS-SCCH. Recited as one example of a radio network controlling method using the above common measurement is Kimmo Hiltunen et al.: Performance of Link Admission Control in a WCDMA System with HS-DSCH and Mixed Services, PIMRC 2004 (hereinafter referred to as non-patent Literature 5).

The radio network controlling method recited in the non-patent Literature 5 is a controlling method using such admission control based on transmission power as the following expression:

$$\mathrm{PnonHS} + \mathrm{Ptot,adm} + C \leqq \mathrm{PLAC}$$

PnonHS represents Non-HSDPA power reported by common measurement, Ptot,adm represents a sum of increments of power of the mobile station allowed to set up DPCH after notification of the above common measurement, C represents an expected increment of power of the mobile station executing admission control and PLAC represents a threshold value of admission control. In the non-patent Literature 5, by reducing PLAC, use of DPCH is regulated to ensure power assigned to HSDPA.

The conventional radio network controlling methods, however, have the problem that setting a threshold value of admission control to be low results in ensuring power for HSDPA even when no mobile station corresponding to HSDPA exists. The reason is that setting a threshold value of admission control to be low leads to regulation of the use of DPCH.

On the other hand, setting a threshold value of admission control to be high to solve the above-described problem invites a problem of reduction in power assigned to a channel for HSDPA. The reason is that setting the threshold value of admission control to be high disables regulation of the use of DPCH.

Thus, an object of the present invention is to provide a radio network controlling method, a radio communication system, and a radio network controller which solve the above-described problems.

SUMMARY OF THE INVENTION

For eliminating the above-described shortcomings, the radio network controlling method, the radio communication system, and the radio network controller of the present invention adopt the following characteristic structures.

(1) A radio network controlling method comprising the steps of

- transmitting data to a mobile station by using a downlink dedicated channel and a downlink shared channel,
- measuring transmission power of all the channels and transmission power of other channel than said downlink shared channel,
- calculating power assigned to said downlink shared channel from the transmission power of other channel than said downlink shared channel,
- calculating an activity ratio of said assigned power from the transmission power of said all the channels, the transmission power of other channel than said downlink shared channel and said assigned power, and regulating use of said downlink dedicated channel according to said assigned power and said activity ratio.

(2) The radio network controlling method comprises the step of regulating set-up of said downlink dedicated channel when a cell load expected upon set-up of said downlink dedicated channel is higher than a predetermined threshold value, the step of regulating use of said downlink dedicated channel being a step of lowering said predetermined threshold value.

(3) The step of regulating use of said downlink dedicated channel is a step of lowering a transmission rate of said downlink dedicated channel.

(4) The step of regulating use of said downlink dedicated channel is a step of releasing said downlink dedicated channel.

(5) The radio network controlling method comprises the step of regulating use of said downlink dedicated channel when said activity ratio is larger than a predetermined activity ratio threshold value and said assigned power is smaller than a predetermined power threshold value.

(6) The radio network controlling method comprises the steps of:

counting the number of mobile stations waiting for data transmission using said downlink shared channel, and regulating use of said downlink dedicated channel according to said number of mobile stations, said assigned power and said activity ratio.

(7) The radio network controlling method comprises the step of:

regulating use of said downlink dedicated channel when said number of mobile stations is larger than a predetermined threshold value of the number of mobile stations, said activity ratio is larger than a predetermined activity ratio threshold value and said assigned power is smaller than a predetermined power threshold value.

(8) A radio network controlling method comprises the steps of transmitting data to a mobile station by using a downlink dedicated channel and a downlink shared channel, measuring transmission power of all the channels, transmission power of other channel than said downlink shared channel and a transmission rate of said downlink shared channel, counting the number of mobile stations waiting for data transmission using said downlink shared channel, calculating a maximum transmission rate of said downlink shared channel per mobile station at the time of continuous transmission by power assigned to said downlink shared channel from said number of mobile stations, the transmission power of said all the channels, the transmission power of other channel than said downlink shared channel and said transmission rate, and regulating use of said downlink dedicated channel according to said maximum transmission rate per mobile station.

(9) The radio network controlling method comprises the step of regulating set-up of said downlink dedicated channel when a cell load expected upon set-up of said downlink dedicated channel is higher than a predetermined threshold value, the step of regulating use of said downlink dedicated channel being a step of lowering said predetermined threshold value.

(10) The step of regulating use of said downlink dedicated channel is a step of lowering a transmission rate of said downlink dedicated channel.

(11) The step of regulating use of said downlink dedicated channel is a step of releasing said downlink dedicated channel.

(12) The step of regulating use of said downlink dedicated channel is executed when said maximum transmission rate per mobile station is smaller than a predetermined threshold value.

(13) The radio network controlling method comprises the steps of calculating power assigned to said downlink shared channel, and regulating use of said downlink dedicated channel according to said maximum transmission rate per mobile station and the power assigned to said downlink shared channel.

(14) A radio communication system comprises means for transmitting data to a mobile station by using a downlink dedicated channel and a downlink shared channel, means for measuring transmission power of all the channels and transmission power of other channel than said downlink shared channel, means for calculating power assigned to said downlink shared channel from the transmission power of other channel than said downlink shared channel, means for calculating an activity ratio of said assigned power from the transmission power of said all the channels, the transmission power of other channel than said downlink shared channel and said assigned power, and means for regulating use of said downlink dedicated channel according to said assigned power and said activity ratio.

(15) A radio communication system comprises means for transmitting data to a mobile station by using a downlink dedicated channel, means for transmitting data to the mobile station by using a downlink shared channel, means for measuring transmission power of all the channels, transmission power of other channel than said downlink shared channel and a transmission rate of said downlink shared channel, means for counting the number of mobile stations waiting for data transmission using said downlink shared channel, means for calculating a maximum transmission rate of said downlink shared channel per mobile station when said base station executes continuous transmission by power assigned to said downlink shared channel from said number of mobile stations, the transmission power of said all the channels, the transmission power of other channel than said downlink shared channel and said transmission rate, and means for regulating use of said downlink dedicated channel according to said maximum transmission rate per mobile station.

(16) A radio network controller, wherein a base station comprises means for transmitting data to a mobile station by using a downlink dedicated channel, means for transmitting data to the mobile station by using a downlink shared channel, and means for measuring transmission power of all the channels and transmission power of other channel than said downlink shared channel to notify said radio network controller of the measurement result, said radio network controller comprising:

means for calculating power assigned to said downlink shared channel from the transmission power of other channel than said downlink shared channel, means for calculating an activity ratio of said assigned power from the transmission power of said all the channels, the transmission power of other channel than said downlink shared channel and said assigned power, and means for regulating use of said downlink dedicated channel according to said assigned power and said activity ratio.

(17) A radio network controller, wherein a base station comprises means for transmitting data to a mobile station by using a downlink dedicated channel, means for transmitting data to the mobile station by using a downlink shared channel, means for measuring transmission power of all the channels and transmission power of other channel than said downlink shared channel to notify said radio network controller of the measurement result, and means for measuring a transmission rate of said downlink shared channel to notify said radio network controller of the measurement result, said radio network controller comprising:

means for counting the number of mobile stations waiting for data transmission using said downlink shared channel, means for calculating a maximum transmission rate of said downlink shared channel per mobile station when said base station executes continuous transmission by power assigned to said downlink shared channel from said number of mobile stations, the transmission power of said all the channels, the transmission power of other channel than said downlink shared channel and said transmission rate, and means for regulating use of said downlink dedicated channel according to said maximum transmission rate per mobile station.

BRIEF DESCRIPTION OF THE DRAWINGS

FIG. 4 is a table for selecting a case number held by the DCH regulation determination unit 24 of the first embodiment of the present invention;

DESCRIPTION OF THE PREFERRED EMBODIMENT

First Embodiment

Figure 1:
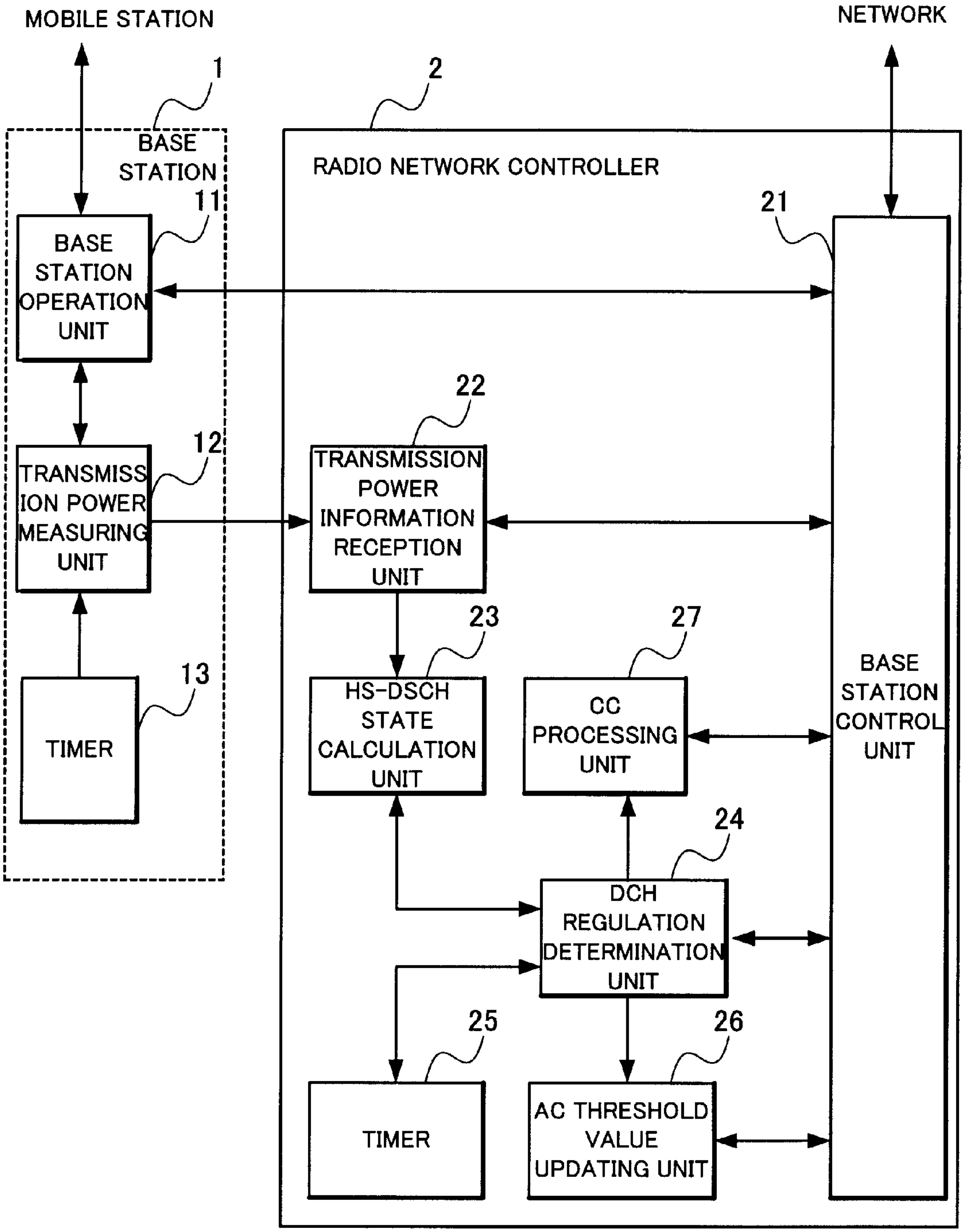
FIG. 1 is a block diagram showing a structure of a first embodiment of the present invention.

Next, a first embodiment of the present invention will be described. FIG. 1 is a block diagram showing one example of a basic structure of a base station and a radio network controller in the embodiment of the present invention.

With reference to FIG. 1, a base station 1 includes a base station operation unit 11 connected to a plurality of mobile stations not shown, a transmission power measuring unit 12 and a timer 13. A radio network controller 2 includes a base station control unit 21 connected to a network not shown, a transmission power information reception unit 22, an HS-DSCH state calculation unit 23, a DCH regulation determination unit 24, a timer 25, an AC threshold value updating unit 26 and a CC processing unit 27.

HS-DSCH (High Speed-Downlink Shared Channel) is a transport channel name, which corresponds to HS-PDSCH as a physical channel. Similarly, DCH (Dedicated Channel) is a transport channel name, which corresponds to DPCH as a physical channel.

Since the base station operation unit 11 has the same function as that of a base station used in a third generation mobile communication system and its structure and operation are known, no description will be made thereof.

The transmission power measuring unit 12 measures TCP (Transmitted Carrier power) and transmission power of a channel other than HS-PDSCH and HS-SCCH (Non-HSDPA power) to notify the connected transmission power information reception unit 22 of the averaged TCP and Non-HSDPA Power based on measurement information from the timer 13. In the present invention, TCP and Non-HSDPA power are averaged at all the times in a measurement section. The information about measurement by the transmission power measuring unit 12 can be shared by the base station operation unit 11.

Since the base station control unit 21 has the same function as that of a radio network controller (RNC) used in a third generation mobile communication system and its structure and operation are known, no description will be made thereof.

The transmission power information reception unit 22 notifies the HS-DSCH state calculation unit 23 of the TCP and Non-HSDPA power received from the transmission power measuring unit 12.

By using the TCP and Non-HSDPA power, the HS-DSCH state calculation unit 23 calculates a use state of HS-DSCH to hold a calculation result.

The DCH regulation determination unit 24 has the function of counting the number of mobile stations connecting A-DPCH under the base station 1 and when at timing of updating an admission control threshold value or at timing of executing congestion control based on time-count information from the timer 25, determines processing contents by using HS-DSCH use state information held in the HS-DSCH state calculation unit 23 and notifies the AC threshold value updating unit 26 or the CC processing unit 27 of the determination result. Counting the number of mobile stations connecting A-DPCH enables the number of mobile stations which receive data by the HSDPA system to be comprehended.

The AC threshold value updating unit 26 is connected to the base station control unit 21 to cause the base station control unit 21 to update a threshold value of admission control of DCH.

The CC processing unit 27 is connected to the base station control unit 21 to cause the base station control unit 21 to execute congestion control. Congestion control denotes a function of avoiding congestion of the system.

Although in FIG. 1, the transmission power information reception unit 22, the HS-DSCH state calculation unit 23, the DCH regulation determination unit 24, the timer 25, the AC threshold value updating unit 26 and the CC processing unit 27 are illustrated as being provided in the radio network controller 2, the respective units can be allotted to the base station 1 and the radio network controller 2. In addition, although in FIG. 1, the base station 1 and the radio network controller 2 are illustrated as independent devices, they can be formed as one device. Furthermore, although in FIG. 1, the base station 1 is singly illustrated, the radio network controller 2 can be connected to a plurality of base stations.

Description of Operation

Next, operation of the present embodiment will be described with reference to the drawings.

In the embodiment of the present invention, a QoS (Quality of Service) class is formed of two classes, a conversational class (hereinafter referred to as CS class) and an interactive class (hereinafter referred to as IA class). CS class is accommodated by DCH. IA class is accommodated, at a mobile station corresponding to HSDPA, by the HSDPA system and at a mobile station not corresponding to HSDPA, is accommodated by DCH. For DCH of the IA class, a plurality of rates can be set. In addition, the mobile station is allowed to subscribe to two classes, the CS class and the IA class in DCH.

Load of admission control of the present invention is calculated by the following expression.

$$\rho = S(SIRi/SFi)$$

ρ represents a calculated load and SIRi represents required quality of DCH (including A-DCH, which A-DCH corresponds to A-DPCH as a physical channel) set up by a mobile station i, SF represents a spreading factor of DCH set up by the mobile station i and S represents taking a total sum of all the SIRi/SFi of the set up DCH.

Here, the required quality (SIR: Signaling to Interference Ratio) is SIR required for satisfying a predetermined error rate, which is determined by a combination of a modulation system, a coding rate and SF.

With a threshold value of admission control of DCH of the IA class as ρmax,new,IA and an increment of a load of a cell of a mobile station which newly requests set-up of DCH as (SIRnew/SFnew), a condition for allowing new set-up of DCH is as follows:

$$S(SIRi/SFi)+(SIRnew/SFnew)<\rho max,new,IA$$

As a threshold value of admission control, a different value can be set for each QoS class.

Figure 2:
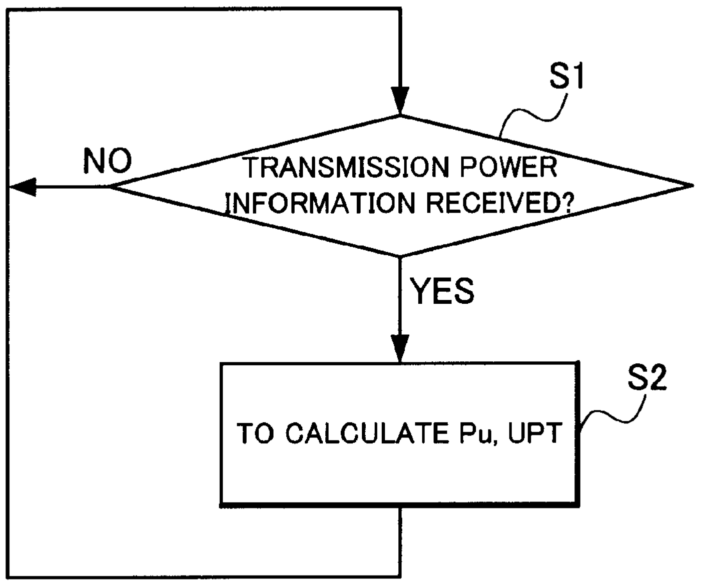
FIG. 2 is a sequence chart showing operation of an HS-DSCH state calculation unit 23 of the first embodiment of the present invention.

FIG. 2 is a sequence chart showing operation of the HS-DSCH state calculation unit 23. The HS-DSCH state calculation unit 23 determines whether TCP and Non-HSDPA power are notified by the transmission power information reception unit 22 (S1). When notified, calculate HSDPA usable power ($P_U$) and power & time utilization ($U_{PT}$) indicative of a use state of HS-DSCH and hold a calculation result (S2).

$P_U$ represents power which can be assigned to HS-PDSCH and HS-SCCH on average. $P_U$ is calculated by the following expression.

$$P_U = MIN(Pmax - PNon\text{-}HSDPA - Pmargin, P_{hs\_max})$$

Pmax represents maximum transmission power of the base station, PNon-HSDPA represents Non-HSDPA power notified, Pmargin represents a margin for power control and $P_{hs\_max}$ represents maximum transmission power of a total of HS-PDSCH and HS-SCCH notified to the base station 1 by the radio network controller 2.

The base station 1 needs to control a total sum of power of HS-PDSCH and HS-SCCH so as to be not more than $P_{hs\_max}$. MIN (X, Y) is an expression for selecting a small value of X and Y. Assume, for example, that X=5 and Y=7, MIN (5, 7) goes to 5.

$U_{PT}$ represents an activity ratio of average HSDPA usable power. $U_{PT}$ is calculated by the following expression.

$$U_{PT} = (PTCP - PNon\text{-}HSDPA)/P_U$$

PTCP represents TCP. In the present embodiment, when $P_U$ is 0, the $U_{PT}$ calculated last time is used.

Figure 3:
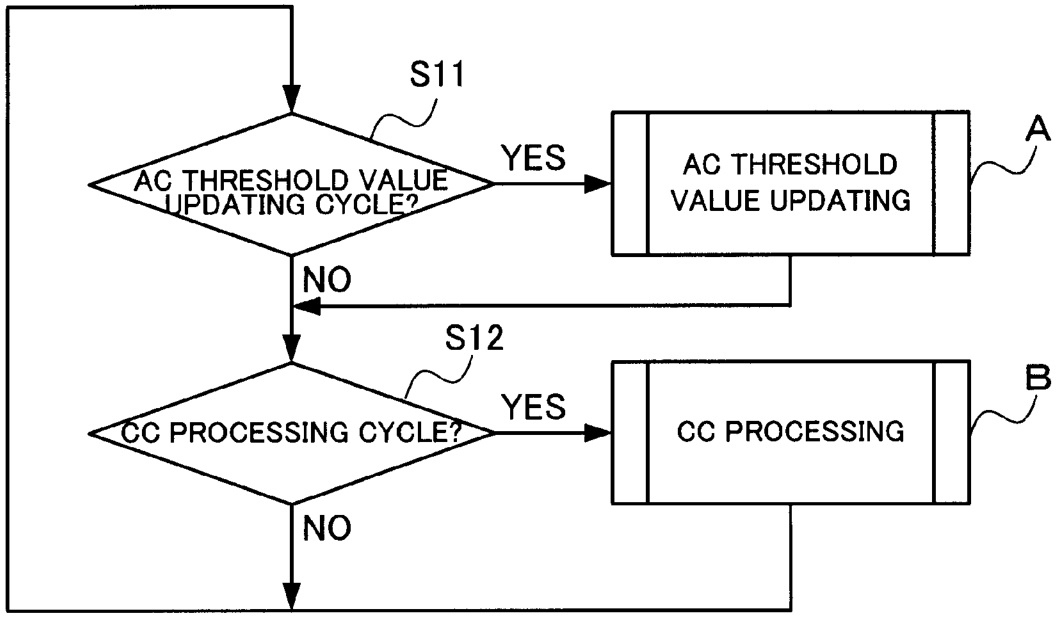
FIG. 3 is a sequence chart showing operation of a DCH regulation determination unit 24 of the first embodiment of the present invention.

FIG. 3 is a sequence chart showing operation of the DCH regulation determination unit 24. The DCH regulation determination unit 24 resets TimerAC_Update when TimerAC_Update is not less than TIAC_Update based on time-count information from the timer 25 (S11) to execute admission control threshold value updating processing of DCH (A). Then, when TimerCC is not less than TICC (S12), reset TimerCC to execute processing of congestion control (B).

FIG. 4 shows a table for selecting a case number determined by $P_U$ and $U_{PT}$ which is held by the DCH regulation determination unit 24. Matrix number [XY] (X, Y=1~3) is determined by $P_U$ and $U_{PT}$ to unitarily select a case number Z (Z=1~3) corresponding to the matrix number. $Th_{UP\_Medium}$ and $Th_{UP\_High}$ in the table are threshold values of $P_U$ and are set such that $Th_{UP\_Medium} < Th_{UP\_High}$.

Based on the above threshold value of $P_U$, determine to which of Low, Medium and High, $P_U$ corresponds and set their conditions as $P_U < Th_{UP\_Medium}$, $Th_{UP\_Medium} \leq P_U < Th_{UP\_High}$, $Th_{UP\_High} \leq P_U$ in this order. $Th_{PTU\_Medium}$ and $Th_{PTU\_High}$ in the table are threshold values of $U_{PT}$ and set such that $Th_{PTU\_Medium} < Th_{PTU\_High}$. Based on the above threshold value of $U_{PT}$, determine to which of Low, Medium and High, $U_{PT}$ corresponds and set their conditions as $U_{PT} < Th_{PTU\_Medium}$, $Th_{PTU\_Medium} \leq U_{PT} < Th_{PTU\_High}$, $Th_{PTU\_High} \leq U_{PT}$ in this order. In a case, for example, where $P_U \leq Th_{UP\_Medium}$ and $Th_{PTU\_Medium} < U_{PT} \leq Th_{PTU\_High}$, $P_U$ corresponds to Low and $U_{PT}$ corresponds to Medium, so that the matrix number will be [12] and the case number will be 3. The table in FIG. 4 is referred to in the admission control threshold value updating processing of DCH in A and processing of congestion control in B in FIG. 3.

Figure 5:
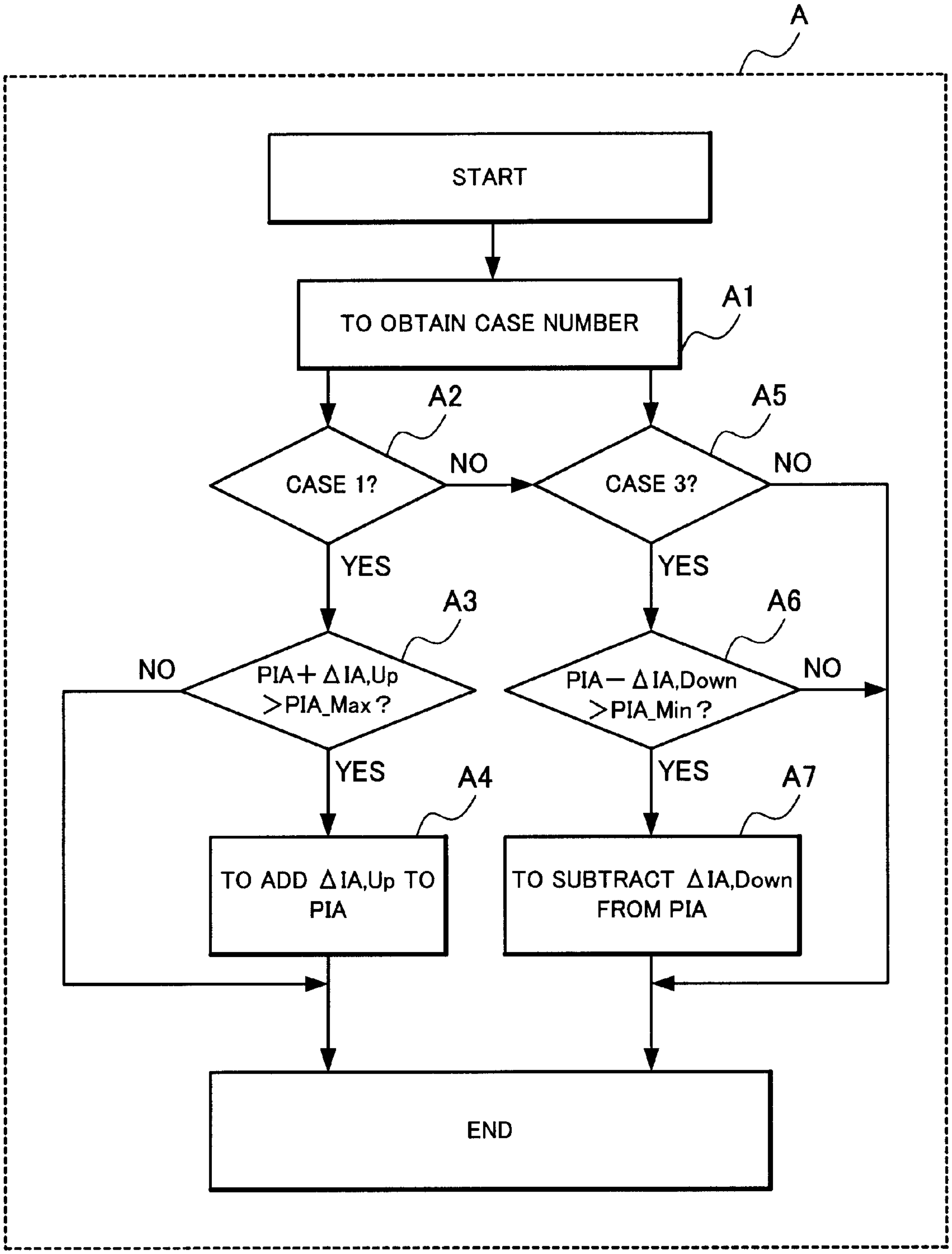
FIG. 5 is a sequence chart showing processing in A in FIG. 3 according to the first embodiment of the present invention.

FIG. 5 is a sequence chart showing operation of the admission control threshold value updating processing of DCH in A in FIG. 3. The DCH regulation determination unit 24 refers to the held table shown in FIG. 4 to select a case number from the calculation result of the HS-DSCH state calculation unit 23 (A1).

Then, when the case number is 1 (A2), determine whether a current admission control threshold value ρIA of the IA class of DCH with a step width ΔIA,UP added fails to exceed an upper limit value ρIA_Max of ρIA or not (A3). When not exceeding ρIA_Max, make the base station control unit 21 add ΔIA,UP to ρIA (A4). When the case number is 3 at A1 (A5), determine whether subtraction of a step width ΔIA, Down from the current admission control threshold valueρIA of the IA class of DCH fails to make the result go lower than a lower limit value ρIA_<Min of ρIA (A6). When not going lower than ρIA_Min, make the base station control unit 21 subtract ΔIA,Down from ρIA (A7). When the case number is 2 at A5, end the processing.

Figure 6:
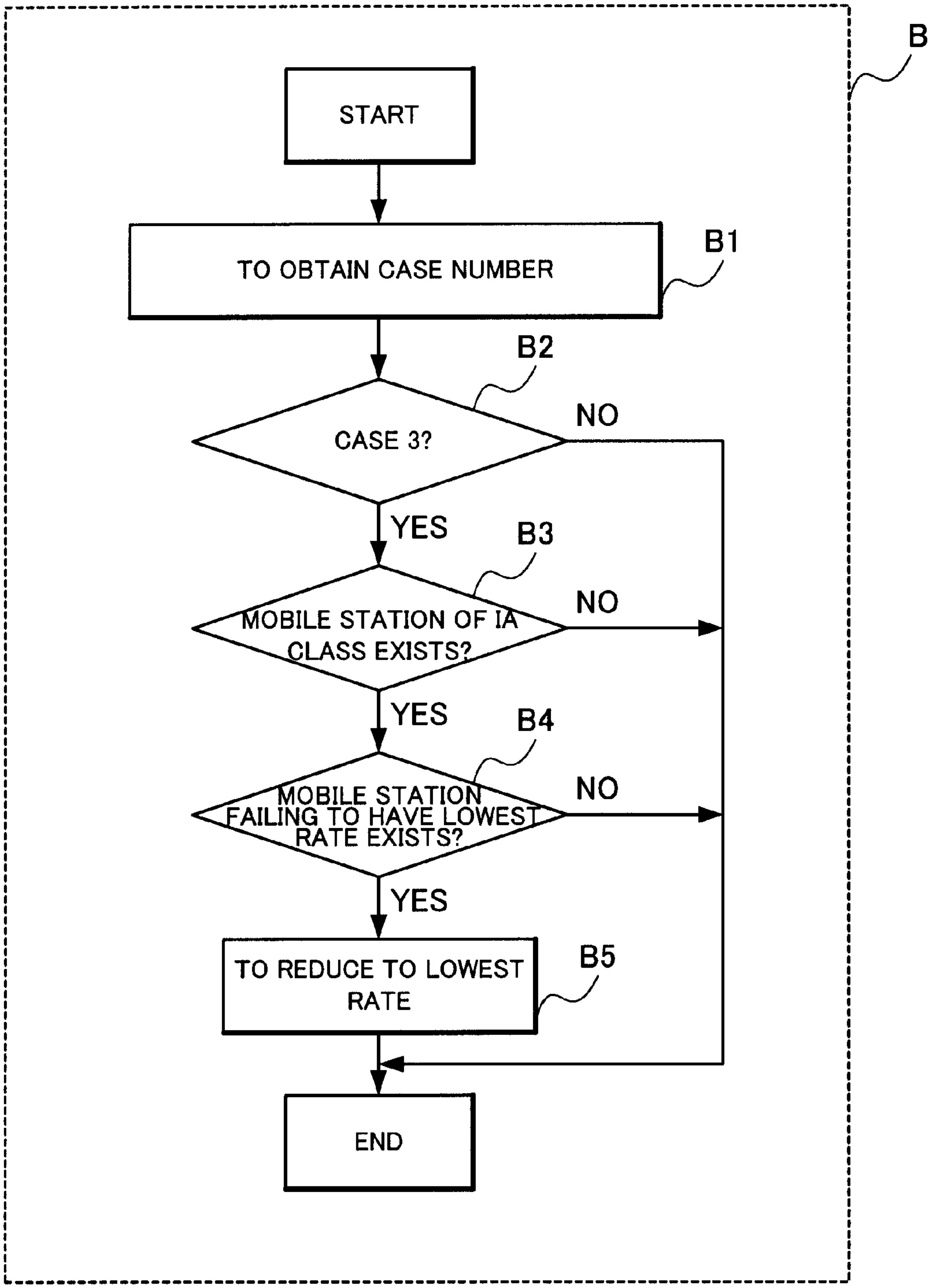
FIG. 6 is a sequence chart showing processing in B in FIG. 3 according to the first embodiment of the present invention.

FIG. 6 is a sequence chart showing operation of congestion control processing in B in FIG. 3. The DCH regulation determination unit 24 selects a case number from the HS-DSCH state calculation unit 23 with reference to the held table shown in FIG. 4 (B1). When the case number is 3 (B2) and there exists a mobile station setting up DCH of the IA class (B3), determine whether there exists a mobile station failing to have the lowest rate in the IA class (B4).

When a mobile station failing to have the lowest rate in the IA class exists, make the base station control unit 21 select a mobile station to the maximum of a number NRateDown from among relevant mobile stations and set the mobile station to have the lowest rate of the IA class (B5). Assume, for example, that with the lowest rate being 8 kbps, existence of three mobile stations UE1 (8 kbps), UE2 (64 kbps) and UE3 (8 kbps) is confirmed at the step of B3, only the UE2 (64 kbps) failing to have the lowest rate is selected at the step of B4. Indication in the parentheses represents a transmission rate.

With reference to FIG. 5 and FIG. 6 of the present embodiment, in case 1, an admission control threshold value of DCH is increased, in case 2, no admission control threshold value of DCH is updated and in case 3, the admission control threshold value of DCH is decreased to execute congestion control. With reference to FIG. 5, in the case 1, since the admission control threshold value of DCH is increased, it is more liable to allow set-up of DCH of the IA class, so that even when the number of mobile stations receiving data by HSDPA is small, reduction in a throughput of the entire system can be prevented. With reference to FIG. 5, in the case 3, since the admission control threshold value of DCH is decreased, the number of mobile stations of DCH of the IA class is increased, so that when power assigned to HSDPA is small, the number of mobile stations accommodated by DCH is limited, resulting in decreasing a total sum of transmission power of DCH to enable power assigned to HSDPA to be increased.

Similarly, with reference to FIG. 6, in the case 3, since the rate of the IA class is decreased to lower a total sum of transmission power of DCH, power assigned to HSDPA can be increased. Accordingly, in the table shown in FIG. 4, it is suitable for a case where power assigned to HSDPA is large or a case where a time rate of data transmission by HS-DSCH is low to be set to the case 1. It is also suitable for a case where power assigned to HSDPA is small or a case where a time rate of data transmission by HS-DSCH is high to be set to the case 3.

While in this mode of operation, as the QoS class, two kinds are defined, the CS class and the IA class, the number of QoS classes is not limited. Neither the number of threshold values of $P_U$ and $U_{PT}$ is limited. In addition, although it is also possible to independently generate the table of FIG. 4 by the processing of updating an admission control threshold value of DCH in A in FIG. 3 and operation of congestion control processing in B in FIG. 3, in this case, threshold values of $P_U$ and $U_{PT}$ need to be set independently.

Next, the operation example shown in FIG. 2 will be described. Assume as parameters that Pmax=20 W, Pmargin=2 W and $P_{hs\_max}$=10 W. Assume now that the HS-DSCH state calculation unit 23 receives a notification that PTCP=17 W and PNon-HSDPA=15 W, $P_U$ and $U_{PT}$ will be updated as follows:

$$
\begin{aligned}
P_U &= \mathrm{MIN}(P\mathrm{max} - Pnon\text{-}HSDPA - P\mathrm{margin},\ P_{hs\_max}) \\
&= \mathrm{MIN}(20 - 15 - 2,\ 10) \\
&= 3W
\end{aligned}
$$

$$
U_{PT} = (PTCP - PNon\text{-}HSDPA)/P_U = (17 - 15)/3 = 0.67
$$

Subsequently, the operation examples shown in FIG. 3 and FIG. 4 will be described. Assume as parameters that TimerAC_Update=20 sec., TIAC_Update=20 sec., $Th_{UP\_Medium}$=2 W, $Th_{UP\_High}$=6 W, $Th_{PTU\_Medium}$=0.20 and $Th_{PTU\_High}$=0.60.

Now, the timer TimerAC_Update of an admission control threshold value update cycle counts 20 seconds as an update cycle (TIAC_Update), so that the DCH regulation determination unit 24 executes the processing of updating the admission control threshold value of DCH. With reference to the table of FIG. 4, since $P_U$ is 3 W, $Th_{UP\_Medium}$=2 W<$P_U$=3 W<$Th_{UP\_High}$=6 W, so that $P_U$ is determined to be Medium. Similarly, since $U_{PT}$ is 0.67, $U_{PT}$ is determined to be High because $Th_{PTU\_High}$=0.6<$U_{PT}$=0.67. Accordingly, the matrix number will be [21] and the case number will be 3. Then, proceed to the processing of updating the admission control threshold value of DCH in FIG. 5.

Next, the operation example shown in FIG. 5 will be described. Assume now that an admission control threshold value is ρIA=0.60. Also assume that ΔIA,Down=0.05 and a lower limit value ρIA_Min of ρIA is 0.50. Since the case number in the table of FIG. 4 is 3, the DCH regulation determination unit 24 executes processing of reducing a threshold value of DCH (A5, Yes). Since even when the current threshold value of the IA class ρIA=0.65 is subtracted by ΔIA, Down=0.05, the value fails to go below ρIA_Min=0.05 (A6), make the base station control unit 21 update ρIA to 0.65−0.05=0.60 (A7).

Second Embodiment

Next, a second embodiment of the present invention will be described. Structure of the present embodiment is the same as that of the first embodiment shown in FIG. 1.

Description of Operation

Next, operation of the present embodiment will be descried with reference to the drawings.

Figure 7:
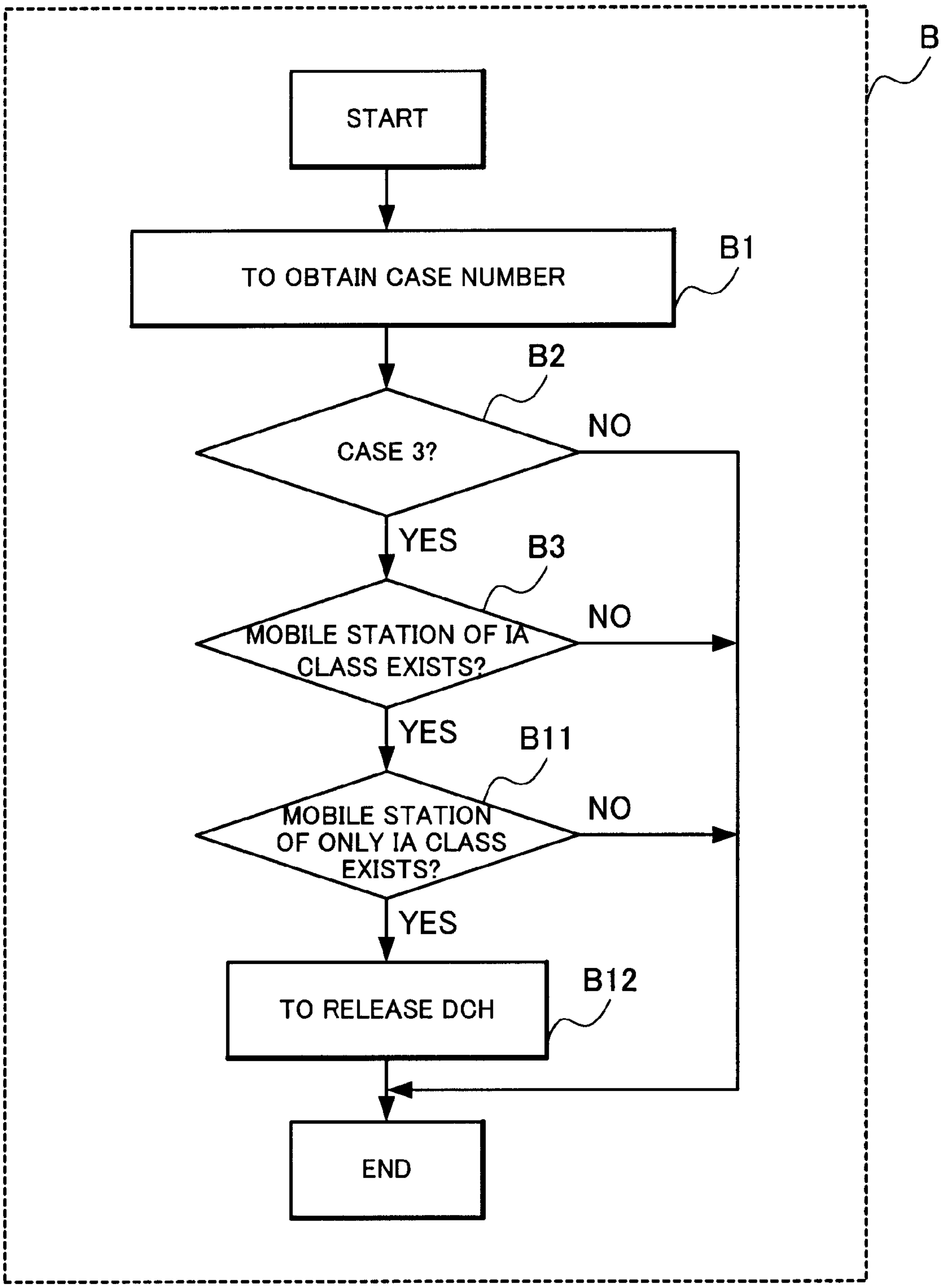
FIG. 7 is a sequence chart showing processing in A in FIG. 3 according to a second embodiment of the present invention.

The second embodiment differs from the first embodiment in changing the sequence chart of FIG. 6 to FIG. 7. With reference to FIG. 7, operation of the second embodiment of the present invention differs from that of the first embodiment in changing the steps at B4 and B5 in FIG. 6 to B11 and B12, respectively. More specifically, when there exists a mobile station having set up DCH of the IA class at B3, determine whether there exists a mobile station subscribing only to the IA class (S11) and when there exists a mobile station subscribing only to the IA class, make the base station control unit 21 select mobile stations to a maximum number of NRelease from among relevant mobile stations to release DCH (S12). In the present embodiment, for making data reception of the CS class being connected continue, no DCH is released when the mobile station subscribes to the CS lass.

The second embodiment has the effect of increasing power assigned to HSDPA which will be increased by the execution of congestion control to one mobile station more than that by the first embodiment.

Third Embodiment

Next, a third embodiment of the present invention will be described. Structure of the present embodiment is the same as that of the first embodiment shown in FIG. 1.

Description of Operation

Operation of the present embodiment will be described with reference to the drawings. The third embodiment differs from the first embodiment in changing the sequence charts of FIG. 3 to FIG. 4 to those shown in FIG. 8 and FIG. 9.

Figure 8:
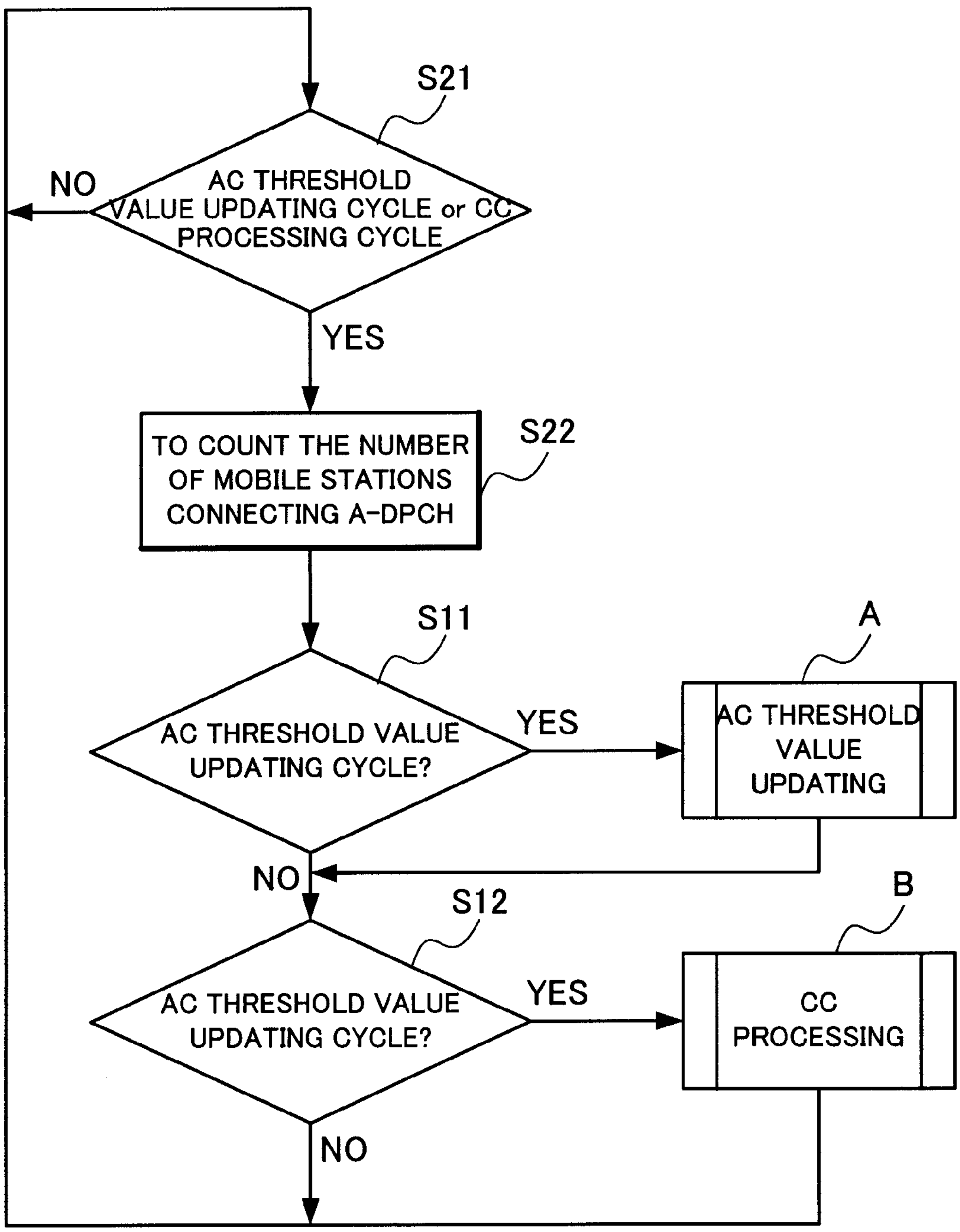
FIG. 8 is a sequence chart showing operation of a DCH regulation determination unit 24 of a third embodiment of the present invention.

With reference to FIG. 8, the present embodiment differs from the first embodiment in adding the steps of S21 and S22 prior to S11 in FIG. 3. More specifically, based on time-count information from the timer 25, the DCH regulation determination unit 24 determines whether the timer TimerAU_Update of the admission control threshold value updating cycle of DCH goes beyond an updating cycle TIAC_Update or not or whether a timer TimerCC of the congestion control executing updating cycle goes beyond an updating cycle TICC (S21). Upon determining that the TimerAC_Update or the TimerCC goes beyond the updating cycle, count a number $N_{HS\text{-}DSCH\_UEs}$ of the mobile stations connecting A-DPCH (S22). Then, proceed to the processing of S11.

Figure 9:
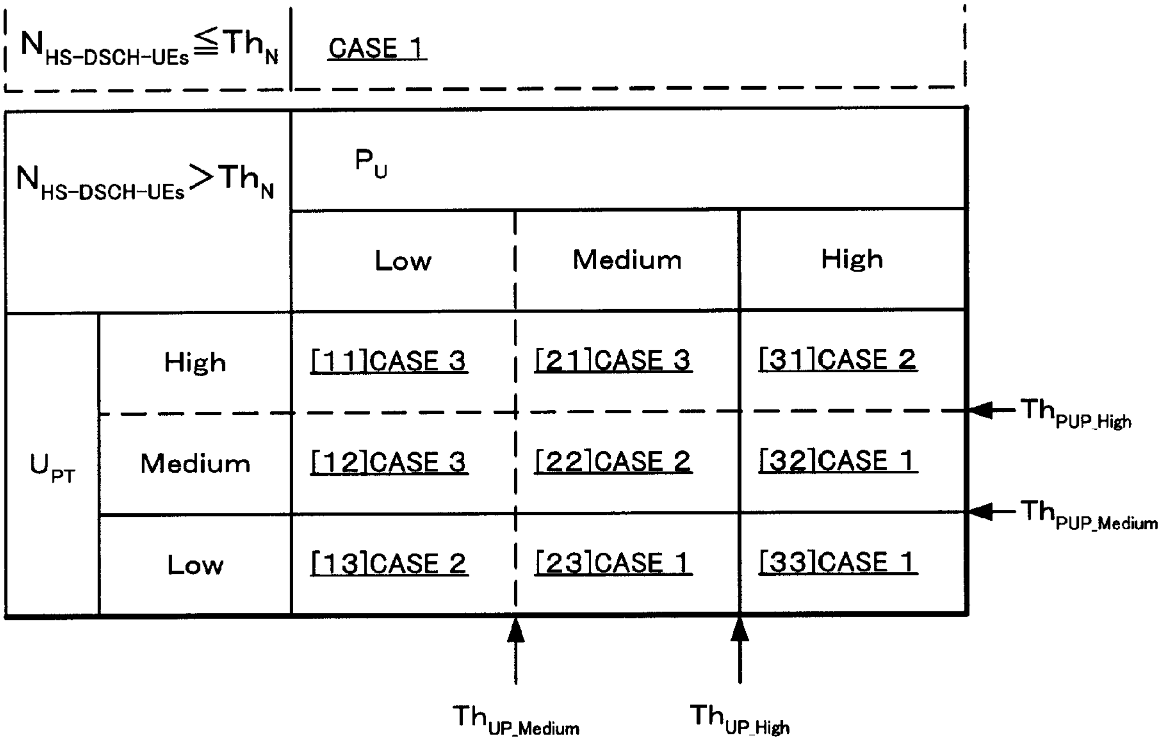
FIG. 9 is a table for selecting a case number which is held by the DCH regulation determination unit 24 of the third embodiment of the present invention.

With reference to FIG. 9, the embodiment differs from the first embodiment shown in FIG. 4 in that a case number is selected from $N_{HS\text{-}DSCH\_UEs}$ in addition to $P_U$ and $U_{PT}$. When $N_{HS\text{-}DSCH\_UEs}$ is not more than a threshold value $Th_N$ ($N_{HS\text{-}DSCH\_UEs} \leqq Th_N$), the case number 1 is selected (the upper part of the diagram in FIG. 9). When $N_{HS\text{-}DSCH\_UEs}$ is larger than $Th_N$ ($N_{HS\text{-}DSCH\_UEs} > Th_N$), determine a matrix number according to $P_U$ and $U_{PT}$ similarly to FIG. 4.

According to the third embodiment, when the number of mobile stations connecting A-DPCH is small, the case number 3 is not selected, so that as compared with the first embodiment, use of DCH can be regulated more efficiently.

Fourth Embodiment

Next, a fourth embodiment of the present invention will be described.

Figure 10:
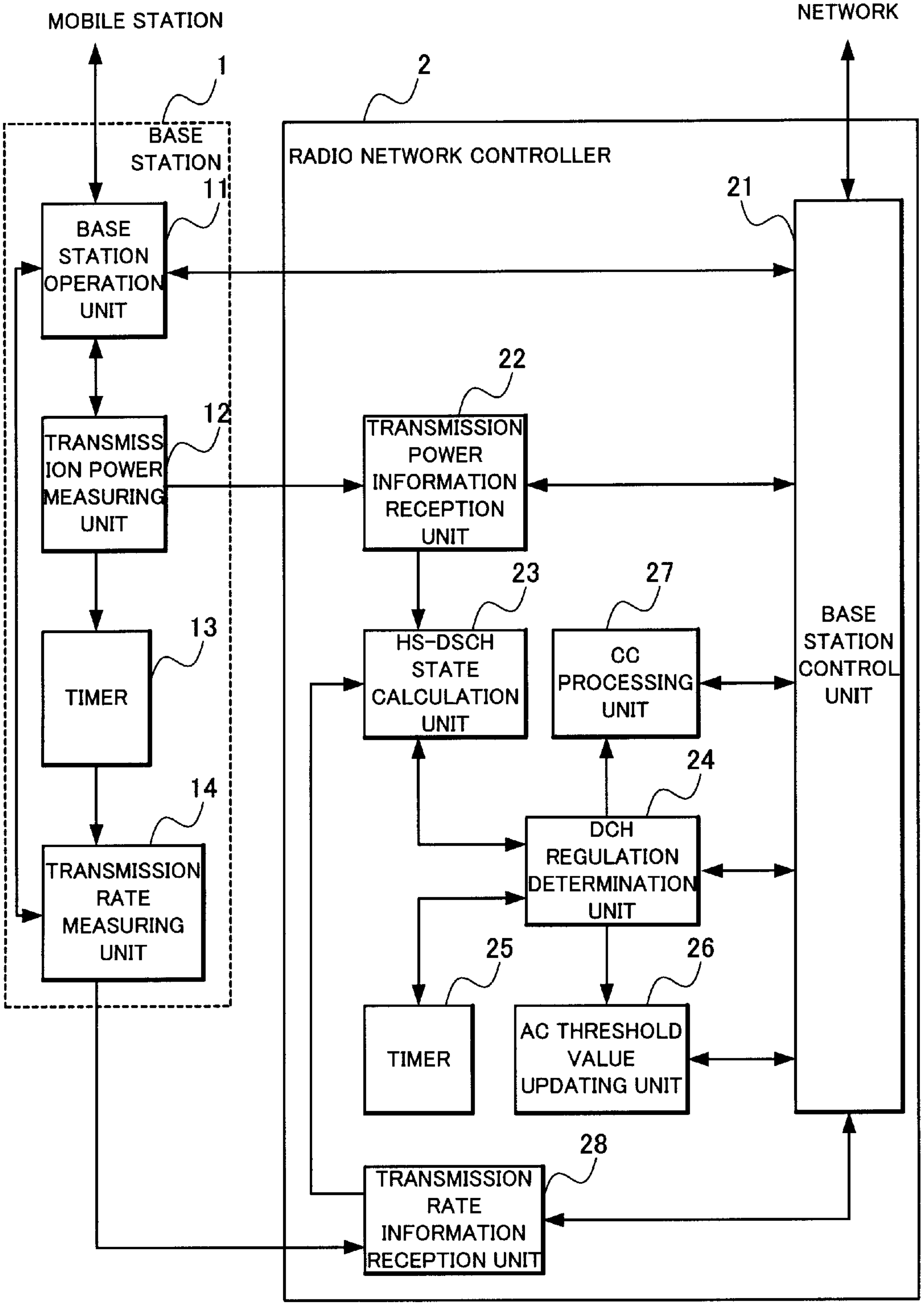
FIG. 10 is a block diagram showing a structure of a fourth embodiment of the present invention.

FIG. 10 is a block diagram showing one example of a basic structure of a base station and a radio network controller according to the embodiment of the present invention.

As compared with the structure of the first embodiment shown in FIG. 1, the fourth embodiment differs in adding a transmission rate measuring unit 14 to the structure of the base station 1 and a transmission rate information reception unit 28 to the structure of the radio network controller 2.

The transmission rate measuring unit 14 counts the number of bits transmitted by HS-DSCH and notifies the connected transmission rate information reception unit 28 of the volume of transmission data transmitted by HS-DSCH per unit time (hereinafter referred to as HS-DSCH provided bit rate), which is measured based on time-count information from the timer 13.

The transmission rate information reception unit 28 notifies the HS-DSCH state calculation unit 23 of the HS-DSCH provided bit rate received from the transmission rate measuring unit 14.

The HS-DSCH state calculation unit 23 calculates a use state of HS-DSCH by using the HS-DSCH provided bit rate received from the transmission rate information reception unit 28 in addition to TCP and Non-HSDPA power and holds the calculation result. Since the remaining part is the same as the structure of the first embodiment shown in FIG. 1, no description will be made thereof.

Description of Operation

Next, operation of the present embodiment will be described with reference to the drawings.

Fourth embodiment differs from the third embodiment in changing FIGS. 3 and 4 to FIG. 11 and FIG. 12, respectively.

Figure 11:
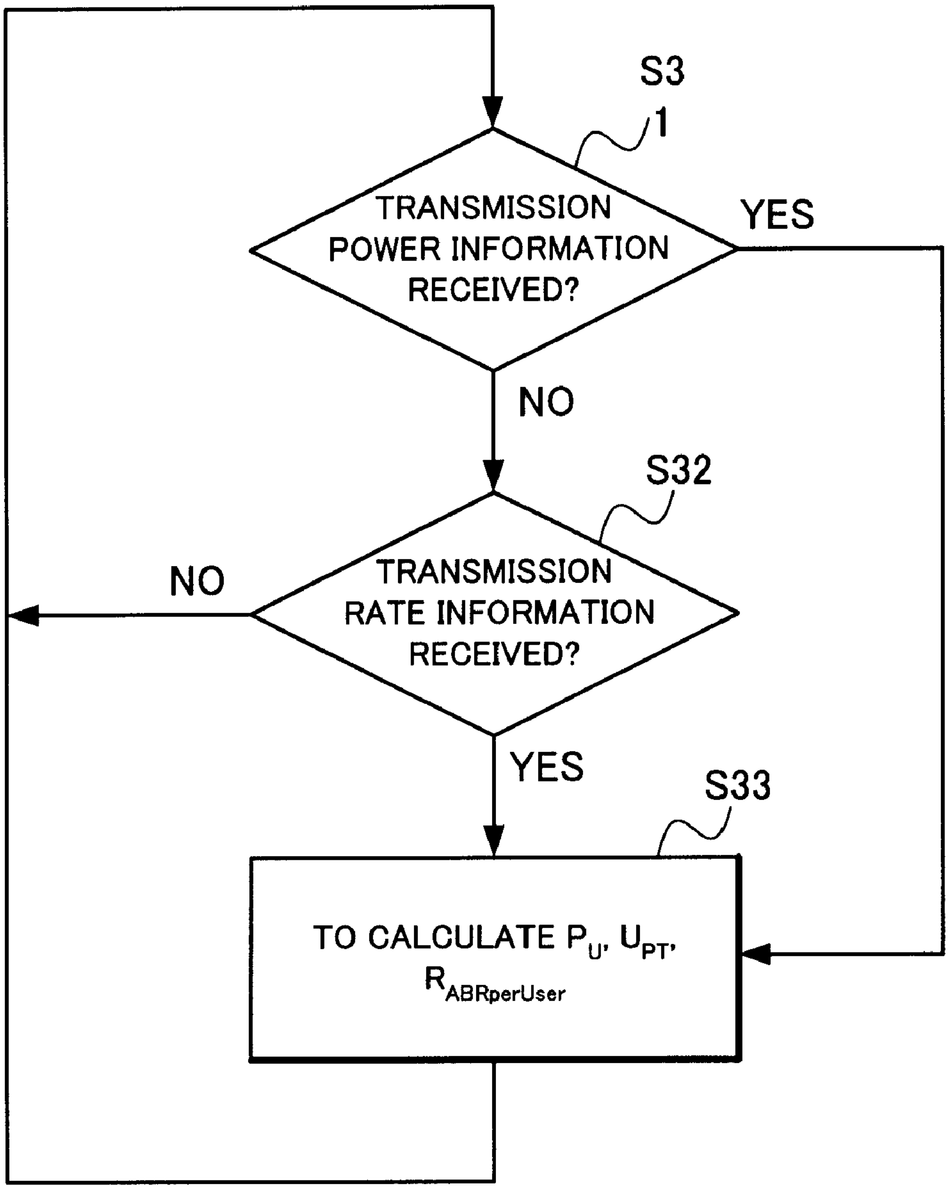
FIG. 11 is a sequence chart showing operation of an HS-DSCH state calculation unit 23 of the fourth embodiment of the present invention.

FIG. 11 is a sequence chart showing operation of the HS-DSCH state calculation unit 23. The HS-DSCH state calculation unit 23 determines whether TCP and Non-HSDPA power are notified by the transmission power information reception unit 22 (S31). When not notified TCP and Non-HSDPA power, determine whether an HS-DSCH provided bit rate is notified by the transmission rate information reception unit 28 (S32). When notified either TCP and Non-HSDPA power or the HS-DSCH provided bit rate, calculate $P_U$, $U_{PT}$ and an HS-DSCH available bit rate per user ($R_{ABRperuser}$) indicative of a use state of HS-DSCH to hold a calculation result (S33).

$R_{ABRperUser}$ indicates a maximum volume of transmission data of HS-DSCH per unit time and per mobile station when data is continuously transmitted by HSDPA usable power. $R_{ABRperUser}$ is calculated by the following expression:

$$R_{ABRperUser} = (\text{RPBR,IA})/U_{PT}/N_{HS\text{-}DSCH\_Ues}$$

RPBR, IA represents an HS-DSCH provided bit rate measured by HS-DSCH of the IA class. The other parameters are the same as those of the first embodiment. In the present embodiment, when $N_{HS\text{-}DSCH\_UEs}$ or $U_{PT}$ is 0, $R_{ABRperUser}$ calculated last time is used.

Figure 12:
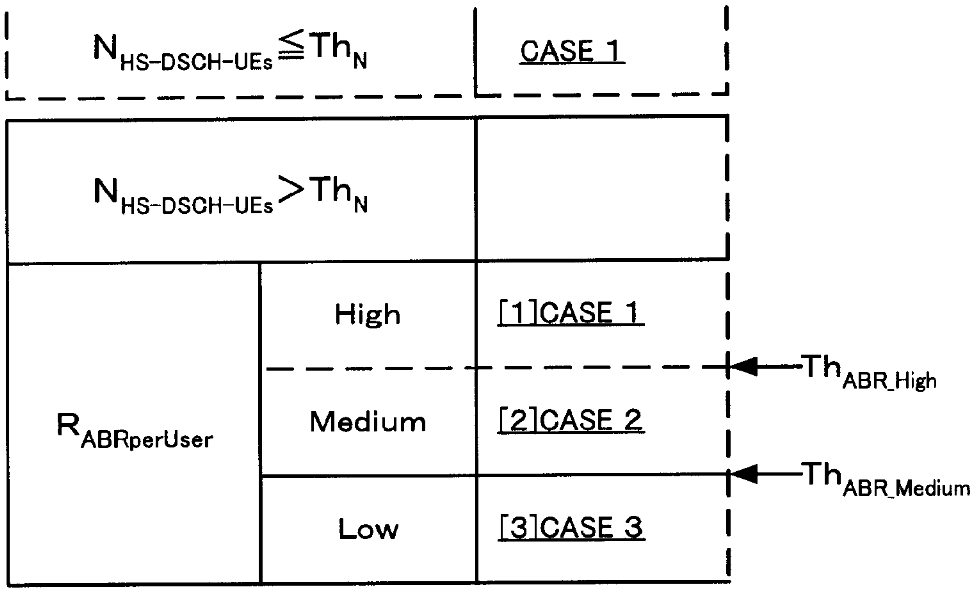
FIG. 12 is a table for selecting a case number which is held by the DCH regulation determination unit 24 of the fourth embodiment of the present invention.

FIG. 12 is a table for selecting a case number determined by $R_{ABRperUser}$ and $N_{HS\text{-}DSCH\_UEs}$, which is held by the DCH regulation determination unit 24. When $N_{HS\text{-}DSCH\_UEs}$ is not more than a threshold value $Th_N$ ($N_{HS\text{-}DSCH\_UEs} \leqq Th_N$), a case number 1 is selected (the upper part of the diagram in FIG. 12). When $N_{HS\text{-}DSCH\_UEs}$ is larger than $Th_N$ ($N_{HS\text{-}DSCH\_UEs} > Th_N$), a matrix number [X] (X=1-3) is determined by $R_{ABRperUser}$ to unitarily select a case number Z (Z-1-3) corresponding to the matrix number.

$Th_{ABR\_Medium}$ and $Th_{ABR\_High}$ in the table are threshold values of $R_{ABRperUser}$, which are set to be $Th_{ABR\_Medium} < Th_{ABR\_High}$. According to the above $R_{ABRperUser}$ threshold values, determine to which of Low, Medium and High, $R_{ABRperUser}$ corresponds and set their conditions to be $R_{ABRperUser} < Th_{ABR\_Medium}$, $Th_{ABR\_Medium} \leqq R_{ABRperUser} < Th_{ABR\_High}$ and $Th_{ABR\_High} \leqq R_{ABRperUser}$ in this order. The table in FIG. 12 is referred to by the processing of updating an admission control threshold value of DCH in A and the processing of congestion control in B in FIG. 8.

In addition, admission control and congestion control in the present embodiment are assumed to be the same as those in the third embodiment shown in FIG. 5 and FIG. 6, respectively. With reference to the FIG. 5 and FIG. 6 showing the mode of the present embodiment, in the case 1, the admission control threshold value of DCH is increased, in the case 2, no admission control threshold value of DCH is updated and in the case 3, the admission control threshold value of DCH is decreased to execute congestion control. Accordingly, in the table shown in FIG. 12, it is appropriate to set a case where an HS-DSCH provided bit rate is large or a case where the number of mobile stations connecting A-DPCH is small to the case 1. In addition, it is appropriate to set a case where an HS-DSCH provided bit rate is small or a case where the number of mobile stations connecting A-DPCH is large to the case 3.

Setting $Th_N$ to 0 is equivalent to failing to take the number of mobile stations connecting A-DPCH into consideration. Accordingly, only by a transmission rate per user adapted to the HSDPA system, regulation of DCH use can be realized.

On the other hand, when the number of mobile stations connecting A-DPCH is small, setting $Th_N$ to be a value larger than 0 leads to no-selection of the case 3, so that as compared with a case of setting $Th_N$ to 0, DCH use can be regulated more efficiently.

Fifth Embodiment

Next, a fifth embodiment of the present invention will be described. Structure of the present embodiment is the same as that of the fourth embodiment shown in FIG. 10.

Description of Operation

Next, operation of the present embodiment will be described with reference to the drawings.

The fifth embodiment differs from the fourth embodiment in changing the sequence chart in FIG. 6 to that shown in FIG. 7. The difference from the fourth embodiment coincides with the difference between the second embodiment and the first embodiment.

Sixth Embodiment

Next, a sixth embodiment of the present invention will be described. Structure of the present embodiment is the same as that of the fourth embodiment shown in FIG. 10.

Description of Operation

Figure 13:
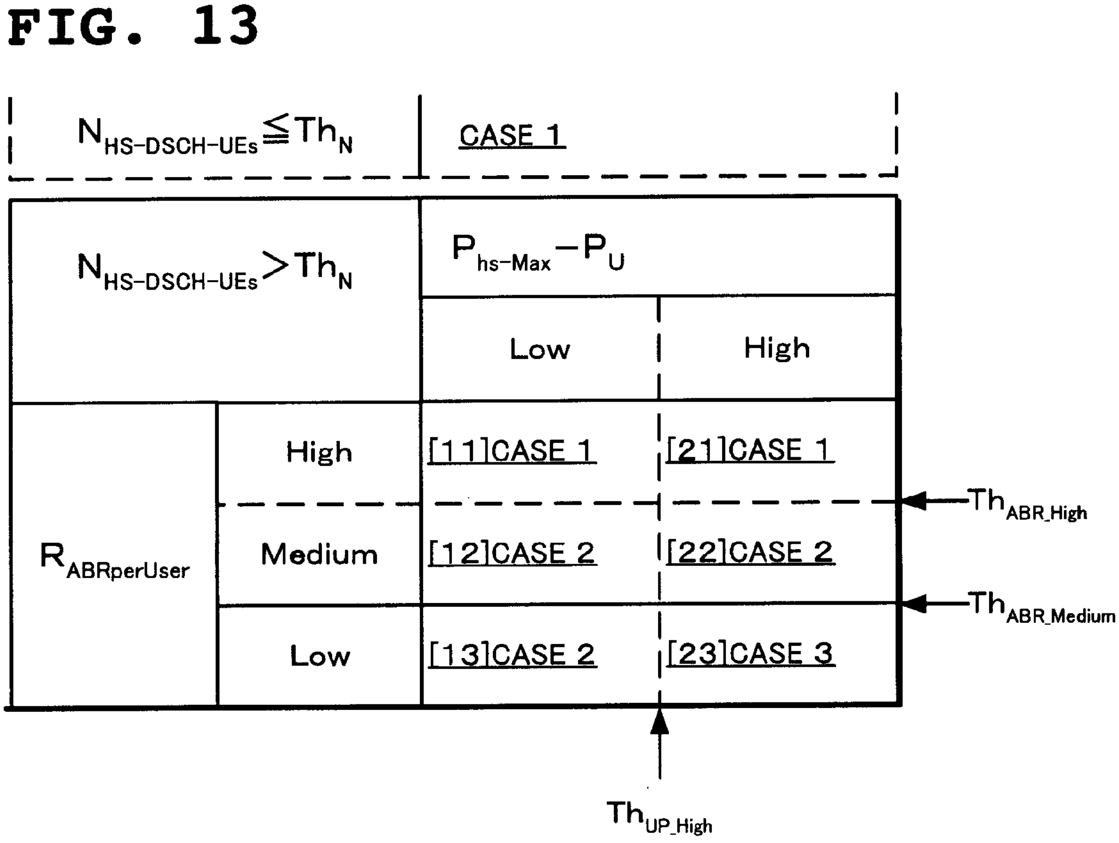
FIG. 13 is a table for selecting a case number which is held by the DCH regulation determination unit 24 of a sixth embodiment of the present invention.

The sixth embodiment differs from the fourth embodiment in changing FIG. 12 to FIG. 13.

Table shown in FIG. 13 differs from that of the fourth embodiment in selecting a case number by using ($P_{hs\_max}$−$P_U$) in addition to $R_{ABRperUser}$ and $N_{HS\text{-}DSCH\_UEs}$. More specifically, a matrix number [XY] (X=1~2, Y=1~3) is determined by $R_{ABRperUser}$ and $P_U$ to unitarily select a case number Z (Z=1~3) corresponding to the matrix number. $Th_{P\_High}$ in the table is a threshold value of ($P_{hs\_max}$−$P_U$). According to the threshold value of ($P_{hs\_max}$−$P_U$), determine to which of Low or High, ($P_{hs\_max}$−$P_U$) corresponds and set the conditions as $(P_{hs\_max}-P_U)<Th_{P\_High}$, $Th_{P\_High}\leqq(P_{hs\_max}-P_U)$, respectively.

According to the sixth embodiment, when determining that HSDPA usable power can be ensured more than ($P_{hs\_max}$−$Th_{P\_High}$), the case number will be 2, so that as compared with the fourth embodiment, regulation of DCH use can be realized more efficiently.

As described in the foregoing, according to the present invention, since when determination is made that HSDPA is short in power, the admission control threshold value of DCH is decreased, the number of mobile stations of DCH can be limited, resulting in decreasing a total sum of transmission power of DCH to increase power assigned to HSDPA. In addition, according to the present invention, since when determination is made that HSDPA is short in power, the rate of DCH is decreased, resulting in reducing a total sum of transmission power of DCH to increase power assigned to HSDPA.

According to the present invention, since when determination is made that HSDPA is short in power, DCH can be released, a total sum of transmission power of DCH can be resultantly decreased to increase power assigned to HSDPA. In addition, according to the present invention, since when determination is made that HSDPA is excess in power, the admission control threshold value of DCH can be decreased, if the number of mobile stations receiving data by HSDPA is small, set-up of DCH is more liable to be allowed to prevent a reduction in a throughput of the entire system.

According to the present invention, since an admission control threshold value of a downlink dedicated channel for data reception can be decreased, the number of mobile stations which execute data reception by a downlink dedicated channel can be regulated, resulting in reducing a total sum of transmission power of the downlink dedicated channels.

Further according to the present invention, since a transmission rate of a downlink dedicated channel for data reception can be reduced, a total sum of transmission power of the downlink dedicated channels can be reduced.

Moreover, according to the present invention, since a downlink dedicated channel for data reception can be released, a total sum of transmission power of downlink dedicated channels can be reduced.

The invention claimed is:

1. A radio network controlling method comprising the steps of:

transmitting data to a mobile station by using a downlink dedicated channel and a downlink shared channel, measuring transmission power of all the channels and transmission power of other channel than said downlink shared channel, calculating transmission power assigned to said downlink shared channel from the transmission power of other channel than said downlink shared channel, calculating an activity ratio of said transmission power assigned to said downlink shared channel from the transmission power of said all the channels, the transmission power of other channel than said downlink shared channel and said transmission power assigned to said downlink shared channel, and regulating use of said downlink dedicated channel by taking said transmission power assigned to said downlink shared channel and said activity ratio into consideration.

2. The radio network controlling method according to claim 1, comprising the step of regulating set-up of said downlink dedicated channel when a cell load expected upon set-up of said downlink dedicated channel is higher than a predetermined threshold value, the step of regulating use of said downlink dedicated channel being a step of lowering said predetermined threshold value.

3. The radio network controlling method according to claim 1, wherein the step of regulating use of said downlink dedicated channel is a step of lowering a transmission rate of said downlink dedicated channel.

4. The radio network controlling method according to claim 1, wherein the step of regulating use of said downlink dedicated channel is a step of releasing said downlink dedicated channel.

5. The radio network controlling method according to claim 1, comprising the step of regulating use of said downlink dedicated channel when said activity ratio is larger than a predetermined activity ratio threshold value and said assigned power is smaller than a predetermined power threshold value.

6. The radio network controlling method according to claim 1, comprising the steps of:

counting the number of mobile stations waiting for data transmission using said downlink shared channel, and regulating use of said downlink dedicated channel according to said number of mobile stations, said assigned power and said activity ratio.

7. The radio network controlling method according to claim 6, comprising the step of:

regulating use of said downlink dedicated channel when said number of mobile stations is larger than a predetermined threshold value of the number of mobile stations, said activity ratio is larger than a predetermined activity ratio threshold value and said assigned power is smaller than a predetermined power threshold value.

8. A radio network controlling method comprising the steps of:

transmitting data to a mobile station by using a downlink dedicated channel and a downlink shared channel, measuring transmission power of all the channels, transmission power of other channel than said downlink shared channel and a transmission rate of said downlink shared channel, counting the number of mobile stations waiting for data transmission using said downlink shared channel, calculating a maximum transmission rate of said downlink shared channel per mobile station at the time of continuous transmission by power assigned to said downlink shared channel from said number of mobile stations, the transmission power of said all the channels, the transmission power of other channel than said downlink shared channel and said transmission rate, and regulating use of said downlink dedicated channel according to said maximum transmission rate per mobile station, and regulating set-up of said downlink dedicated channel when a cell load expected upon set-up of said downlink dedicated channel is higher than a predetermined threshold value, the step of regulating use of said downlink dedicated channel being a step of lowering said predetermined threshold value, wherein the step of regulating use of said downlink dedicated channel is executed when said maximum transmission rate per mobile station is smaller than a predetermined threshold value.

9. The radio network controlling method according to claim 8, wherein the step of regulating use of said downlink dedicated channel is a step of lowering a transmission rate of said downlink dedicated channel.

10. The radio network controlling method according to claim 8, wherein the step of regulating use of said downlink dedicated channel is a step of releasing said downlink dedicated channel.

11. The radio network controlling method according to claim 8, comprising the steps of:

calculating power assigned to said downlink shared channel, and regulating use of said downlink dedicated channel according to said maximum transmission rate per mobile station and the power assigned to said downlink shared channel.

12. A radio communication system comprising:

a transmitting unit configured to transmit data to a mobile station by using a downlink dedicated channel and a downlink shared channel, a measuring unit configured to measure transmission power of all the channels and transmission power of other channel than said downlink shared channel, a first calculating unit configured to calculate transmission power assigned to said downlink shared channel from the transmission power of other channel than said downlink shared channel, a second calculating unit configured to calculate an activity ratio of said transmission power assigned to said downlink shared channel from the transmission power of said all the channels, the transmission power of other channel than said downlink shared channel and said transmission power assigned to said downlink shared channel, and a regulating unit configured to regulate use of said downlink dedicated channel by taking said transmission power assigned to said downlink shared channel and said activity ratio into consideration.

13. A radio communication system comprising:

a first transmitting unit configured to transmit data to a mobile station by using a downlink dedicated channel, for a second transmitting unit configured to transmit data to the mobile station by using a downlink shared channel, a measuring unit configured to measure transmission power of all the channels, transmission power of other channel than said downlink shared channel and a transmission rate of said downlink shared channel, a counting unit configured to count the number of mobile stations waiting for data transmission using said downlink shared channel, a calculating unit configured to calculate a maximum transmission rate of said downlink shared channel per mobile station when said base station executes continuous transmission by power assigned to said downlink shared channel from said number of mobile stations, the transmission power of said all the channels, the transmission power of other channel than said downlink shared channel and said transmission rate, for a first regulating unit configured to regulate use of said downlink dedicated channel according to said maximum transmission rate per mobile station and a second regulating unit configured to regulate set-up of said downlink dedicated channel when a cell load expected upon set-up of said downlink dedicated channel is higher than a predetermined threshold value, said first regulating unit configured to regulate use of said downlink dedicated channel being a step of lowering said predetermined threshold value, wherein said first regulating unit configured to regulate use of said downlink dedicated channel is executed when said maximum transmission rate per mobile station is smaller than a predetermined threshold value.

14. A radio network controller, wherein a base station comprises:

for a first transmitting unit configured to transmit data to a mobile station by using a downlink dedicated channel, for a second transmitting unit configured to transmit data to the mobile station by using a downlink shared channel, and a measuring unit configured to measure transmission power of all the channels and transmission power of other channel than said downlink shared channel to notify said radio network controller of the measurement result, said radio network controller comprising:

for a first calculating unit configured to calculate transmission power assigned to said downlink shared channel from the transmission power of other channel than said downlink shared channel, for a second calculating unit configured to calculate an activity ratio of said transmission power assigned to said downlink shared channel from the transmission power of said all the channels, the transmission power of other channel than said downlink shared channel and said transmission power assigned to said downlink shared channel, and a regulating unit configured to regulate use of said downlink dedicated channel by taking said transmission power assigned to said downlink shared channel and said activity ratio into consideration.

15. A radio network controller, wherein a base station comprises:

a first transmitting unit configured to transmit data to a mobile station by using a downlink dedicated channel, a second transmitting unit configured to transmit data to the mobile station by using a downlink shared channel, for a first measuring unit configured to measure transmission power of all the channels and transmission power of other channel than said downlink shared channel to notify said radio network controller of the measurement result, and for a second measuring unit configured to measure a transmission rate of said downlink shared channel to notify said radio network controller of the measurement result, said radio network controller comprising:

a counting unit configured to count the number of mobile stations waiting for data transmission using said downlink shared channel, a calculating unit configured to calculate a maximum transmission rate of said downlink shared channel per mobile station when said base station executes continuous transmission by power assigned to said downlink shared channel from said number of mobile stations, the transmission power of said all the channels, the transmission power of other channel than said downlink shared channel and said transmission rate, and a regulating unit configured to regulate use of said downlink dedicated channel according to said maximum transmission rate per mobile station.

* * * * *

UNITED STATES PATENT AND TRADEMARK OFFICE

CERTIFICATE OF CORRECTION

PATENT NO. : 8,305,969 B2
APPLICATION NO. : 11/577865
DATED : November 6, 2012
INVENTOR(S) : Takahiro Nobukiyo and Kojiro Hamabe It is certified that error appears in the above-identified patent and that said Letters Patent is hereby corrected as shown below:

In the Specification

Column 12, Line 34: delete "(X=1-3)" and insert -- (X=1~3) --

Signed and Sealed this
Twenty-third Day of July, 2013

Teresa Stanek Rea
*Acting Director of the United States Patent and Trademark Office*